US010890208B2

(12) United States Patent
Kimura et al.

(10) Patent No.: US 10,890,208 B2
(45) Date of Patent: Jan. 12, 2021

(54) CRANKSHAFT

(71) Applicant: NIPPON STEEL CORPORATION, Tokyo (JP)

(72) Inventors: Yukihiko Kimura, Tokyo (JP); Kenji Tamura, Tokyo (JP); Hiroshi Nogami, Tokyo (JP); Sam Soo Hwang, Tokyo (JP); Kunihiro Yabuno, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/965,208

(22) PCT Filed: Jan. 17, 2019

(86) PCT No.: PCT/JP2019/001190
§ 371 (c)(1),
(2) Date: Jul. 27, 2020

(87) PCT Pub. No.: WO2019/150965
PCT Pub. Date: Aug. 8, 2019

(65) Prior Publication Data
US 2020/0370593 A1 Nov. 26, 2020

(30) Foreign Application Priority Data
Jan. 30, 2018 (JP) ................................. 2018-013308

(51) Int. Cl.
*F16C 3/08* (2006.01)

(52) U.S. Cl.
CPC ..................... *F16C 3/08* (2013.01)

(58) Field of Classification Search
CPC ....................................................... F16C 3/08
See application file for complete search history.

(56) References Cited

U.S. PATENT DOCUMENTS 2,041,507 A * 5/1936 Zeder .................. F16F 15/1414
416/60
2019/0040932 A1* 2/2019 Imano ..................... F16F 15/26

FOREIGN PATENT DOCUMENTS

| FR | 2362311 A1 * | 3/1978 | .......... F16F 15/1442 |
| JP | 2005299807 A | 10/2005 | |
| JP | 2016153658 A | 8/2016 | |

* cited by examiner

*Primary Examiner* — Vicky A Johnson
(74) *Attorney, Agent, or Firm* — Greer Burns & Crain Ltd.

(57) ABSTRACT

A crankshaft includes a plurality of journals, a plurality of pins, and a plurality of crank arms. The journals are coaxially disposed with the rotational center of the crankshaft. The pins are decentered with respect to the journals. Each of the crank arms is disposed between one journal and one pin to join the one journal with the one pin. One or more of the crank arms integrally include a counterweight. The counterweight includes two side surfaces. An added layer of a material different from that of a crankshaft body is provided on each of side surfaces of the counterweight. When the Young's modulus of the added layer is E and the Young's modulus of the material of the crankshaft body is E0, E/E0 is 0.2 to 0.4.

4 Claims, 9 Drawing Sheets

CRANKSHAFT

This is a National Phase Application filed under 35 U.S.C. § 371, of International Application No. PCT/JP2019/001190, filed Jan. 17, 2019, the contents of which are incorporated by reference.

TECHNICAL FIELD

The present disclosure relates to a crankshaft to be mounted on a reciprocating engine for an automobile, a motor cycle, an agricultural machine, or a ship, etc.

BACKGROUND ART

A reciprocating engine requires a crankshaft. This is for deriving power by transforming reciprocating movement of a piston in a cylinder into rotational movement. Generally, a multi-cylinder engine is used for automobiles and others.

FIGS. 1 and 2 are side views to show an example of a typical crankshaft. The crankshaft 1 shown in FIGS. 1 and 2 is to be mounted on a four-cylinder engine. The crankshaft 1 includes five journals J1 to J5, four pins P1 to P4, a front part Fr, a flange part F1, and eight crank arms (hereinafter also referred to as "arms") A1 to A8.

The eight arms A1 to A8 are each disposed between one of the journals J1 to J5 and one of the pins P1 to P4, and each arm joins the journal with the pin, with which the arm itself faces.

In the crankshaft 1 shown in FIG. 1, all the eight arms A1 to A8 integrally include counterweights (hereinafter, may be simply referred to as "weights") W1 to W8, respectively. This crankshaft 1 is referred to as a crankshaft of 4-cylinder 8-counterweight.

Hereinafter, when collectively referring to the journals J1 to J5, the pins P1 to P4, the arms A1 to A8, and the weights W1 to W8, respectively, their symbols are also denoted as "J" for the journals, "P" for the pins. "A" for the anus, and "W" for the weights.

In the crankshaft 1 shown in FIG. 2, among the eight arms A, the front-most first arm A1, the rear-most eighth arm A8, and the fourth am A4 and the fifth arm A5 in the middle integrally include a weight W, respectively. The remaining anus A2, A3, A6 and A7 has no weight. This crankshaft 1 is referred to as a crankshaft of 4-cylinder 4-counterweight.

The journals J, the front part Fr and the flange part F are disposed coaxially with the rotational center of the crankshaft 1. Each pin P is disposed so as to be decentered from the rotational center of the crankshaft 1 by a distance of a half of the piston stroke. The journals J are supported on an engine block via sliding bearings, and serve as a rotating shaft. Each pin P is connected to a large end of a connecting rod (hereinafter also referred to as a "con-rod") via a sliding bearing, and a piston is connected to a small end of the con-rod. A pulley (not shown) for driving a timing belt, a fan belt, and the like is attached to the front part Fr. A flywheel (not shown) is attached to the flange part F1.

In a reciprocating engine, suppression of vibration is a crucial task. This is because the vibration of a reciprocating engine causes noise, thereby aggravating the environment around the reciprocating engine. Particularly, in a vehicle such as an automobile mounted with a reciprocating engine, since a comfortable interior environment is required, the suppression of vibration is highly demanded. Here, the crankshaft is a heavy part that rotates in the reciprocating engine. Therefore, the vibration suppression of the crankshaft will significantly contribute to the vibration suppression of the reciprocating engine.

To achieve the vibration suppression of the crankshaft, conventionally the following two strategies have been taken. The first strategy is to optimize the structure of the sliding bearing that supports the journal of the crankshaft. The second strategy is to provide vibration damping function to attachment components to be attached to the crankshaft. As the first strategy, Japanese Patent Application Publication No. 2016-153658 (Patent Literature 1) discloses a technique of improving vibration characteristics by appropriately setting a clearance between the journal and the sliding bearing. As the second strategy, Japanese Patent Application Publication No. 2005-299807 (Patent Literature 2) discloses a technique of causing bending vibration and twisting vibration to be damped by attaching a damper pulley (crankshaft pully) to the front part of the crankshaft.

CITATION LIST

Patent Literature

Patent Literature 1: Japanese Patent Application Publication No. 2016-153658

Patent Literature 2: Japanese Patent Application Publication No. 2005-299807

SUMMARY OF INVENTION

Technical Problem

In the first strategy, when the clearance changes due to wear or the like of the sliding bearing, desired vibration suppression performance cannot be achieved. In the second strategy, as a result of attaching an accessory component (damper pulley) having a special structure, the weight of the entire reciprocating engine will increase, thereby worsening the fuel economy. Further, since the number of components constituting the reciprocating engine increases, the reliability will deteriorate. In short, in the conventional strategies, it is not possible to sufficiently suppress the vibration of crankshaft by a simple configuration.

It is an object of the present disclosure is to provide a crankshaft that can sufficiently suppress vibration by a simple configuration.

Solution to Problem

The crankshaft according to an embodiment of the present disclosure is a crankshaft for a reciprocating engine. The crankshaft includes: a plurality of journals which are disposed coaxially with a rotational center of the crankshaft; a plurality of pins which are decentered with respect to the plurality of journals; and a plurality of crank arms which are each disposed between one journal and one pin, and join the one journal with the one pin. One or more of the crank arms integrally include a counterweight including two side surfaces. An added layer of a different material from that of the crankshaft body including the journals, the pins, and the crank arms is provided on each of the side surfaces of the counterweight. When the Young's modulus of the material of the added layer is $E$ and the Young's modulus of the material of the crankshaft body is $E_0$, $E/E_0$ is 0.2 to 0.4.

Advantageous Effects of Invention

According to the crankshaft of an embodiment of the present disclosure, it is possible to sufficiently suppress vibration by a simple configuration.

DESCRIPTION OF EMBODIMENTS

To solve the above described problems, the present inventors have focused on the crankshaft itself instead of the accessory components attached to the cankshaft.

Moreover, they have conducted diligent examination focusing on the weight in an arm with weight. As a result, they have obtained the following findings.

Normally, a crankshaft is formed by hot forging or casting. Therefore, in a conventional crankshaft, its material is the same over its entirety. That is, the material of the weight is over its entirety the same as the material of other portions of the crankshaft. The material of the journal, the pin, and the arm of the crankshaft is, for example, a carbon steel. In the present description, the journal, the pin, and the arm are collectively referred to as a crankshaft body, and the same material as that of the crankshaft body is also referred to as a normal material.

It is assumed that there exists, in the weight, not only a portion of the normal material but also a portion of a different material from the normal material (hereinafter, referred to as a "different material"). The portion of the different material is provided in close contact with the surface of the portion of the normal material. Different materials have different material constants such as the Young's modulus. In this case, it is presumed that the following situation occurs.

A crankshaft is a one body. Therefore, when the crankshaft vibrates as the crankshaft rotates, the weight vibrates and deforms. In this case, the portion of the different material deforms following the deformation of the portion of the normal material. As described above, the material constants of the portion of the different material are different from those of the portion of the normal material. For that reason, ease of deformation is different between in the portion of the different material and the portion of the normal material. In that case, when the weight vibrates and deforms, a force acts on the portion of the different material and the portion of the normal material to inhibit deformation of each other. Since the energy of vibration is dissipated by this force, the vibration is efficiently damped. Therefore, the vibration of the crankshaft is suppressed.

To confirm the validity of the above described presumption, the following examination has been conducted.

[Examination Step 1]

In the examination step 1, the level of vibration when an added layer having a different material was provided in the weight was investigated. This investigation was performed by vibration analysis using a finite element method (FEM). In the analysis of the examination step 1, two side surfaces were selected as a portion where an added layer is provided in the weight, and the material of the added layer to be provided on the two side surfaces was variously changed.

Figure 3:
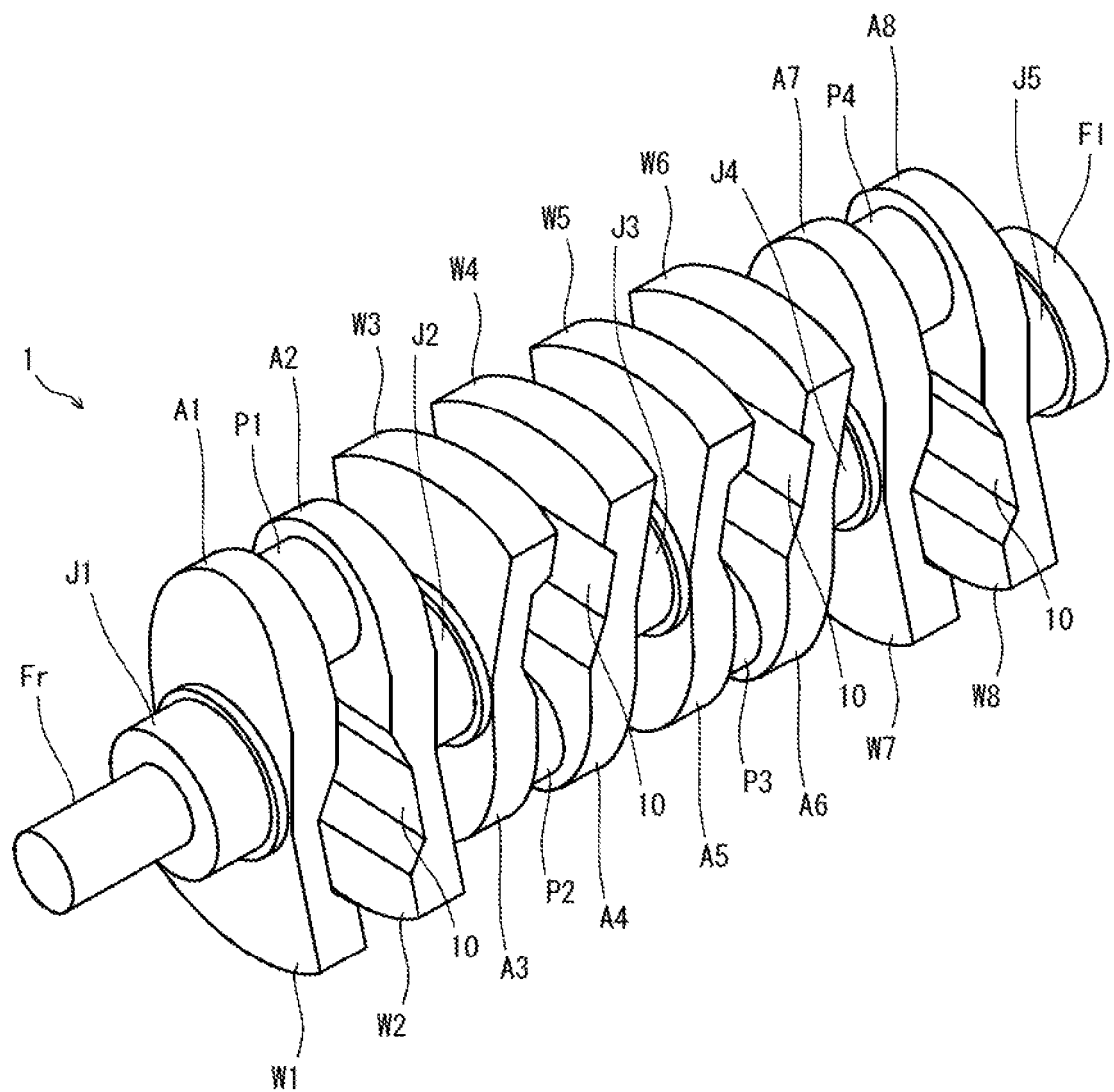
FIG. 3 is a perspective view of a crankshaft assumed in an examination step 1 by the present inventors.
Figure 4:
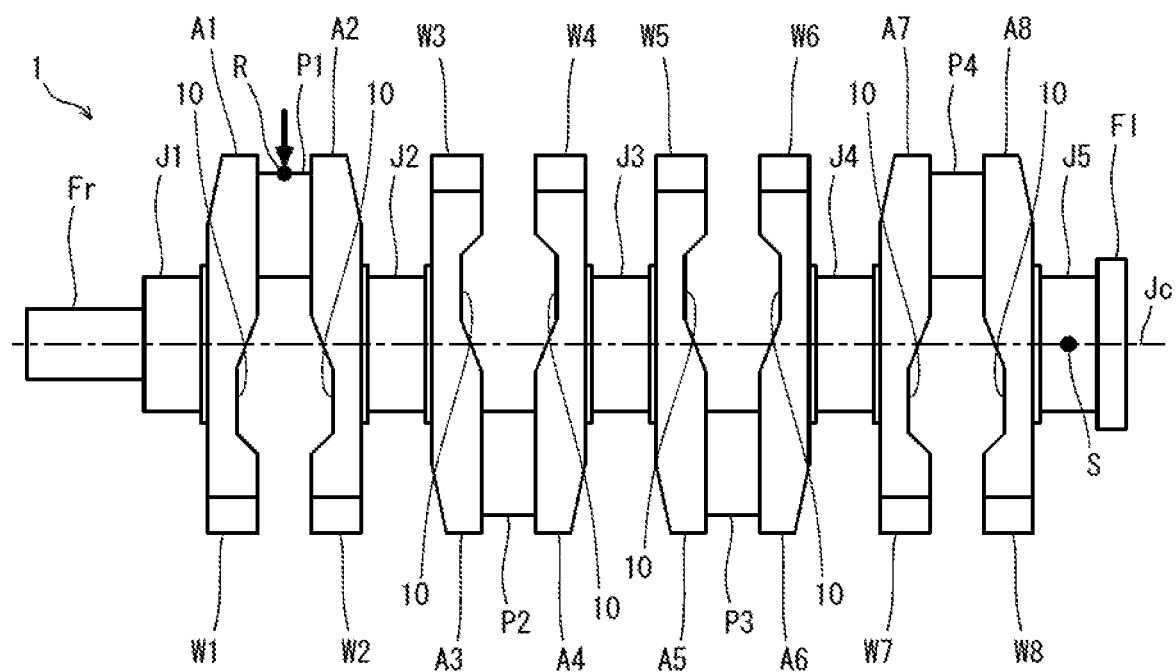
FIG. 4 is a side view of the crankshaft shown in FIG. 3.
Figure 5:
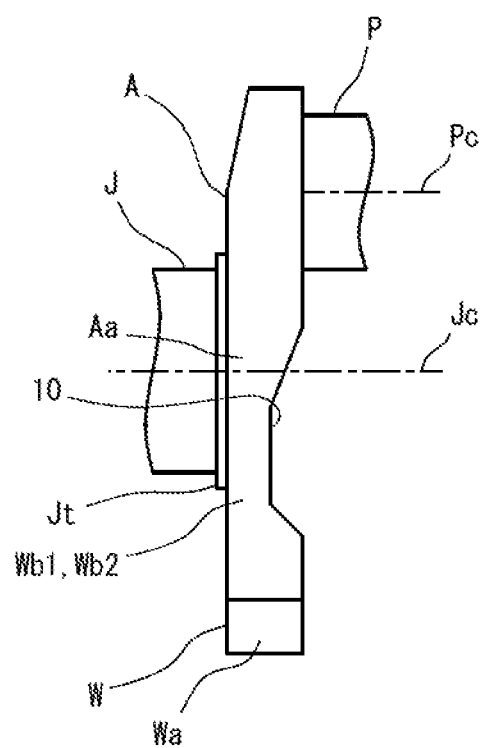
FIG. 5 is a side view of an arm with weight in the crankshaft shown in FIG. 3.
Figure 6:
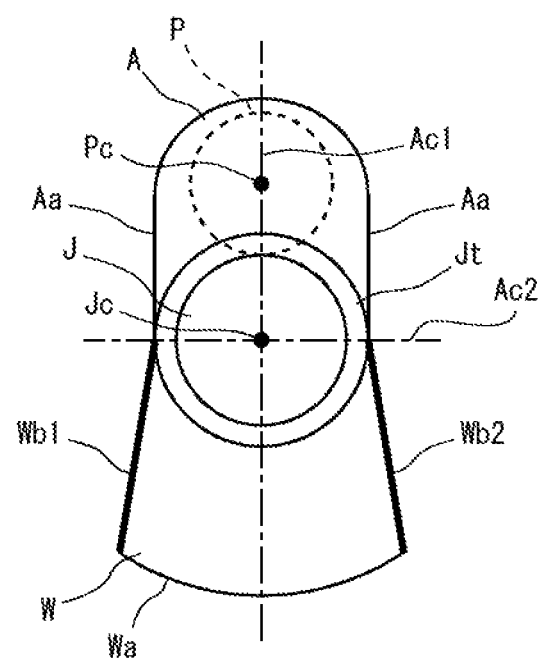
FIG. 6 is a front view of the arm with weight shown in FIG. 5.

FIGS. 3 to 6 are diagrams showing the crankshaft which was assumed in the examination step 1. Among those figures, FIG. 3 is a perspective view of the crankshaft, and FIG. 4 is a side view of the crankshaft. FIG. 5 is a side view of an arm with weight in the crankshaft, and FIG. 6 is a front view of the arm with weight. In the present description, in an arm with weight, the face to which the journal J is connected is referred to as a front face, and the face opposite thereto, that is, the face to which the pin P is connected, is referred to as a rear face. Note that FIG. 6 shows a longitudinal centerline Ac1 and a lateral centerline Ac2 of the arm A. In the present description, the longitudinal centerline Ac1 of the arm A is a straight line perpendicular to the axial centerline Jc of the journal J and the axial centerline Pc of the pin P, and the lateral centerline Ac2 is a straight line orthogonal to the longitudinal centerline Ac1 and the axial centerline Jc of the journal J. In the arm with weight, the direction in which the lateral centerline Ac2 extends is referred to as a width direction.

Figure 1:
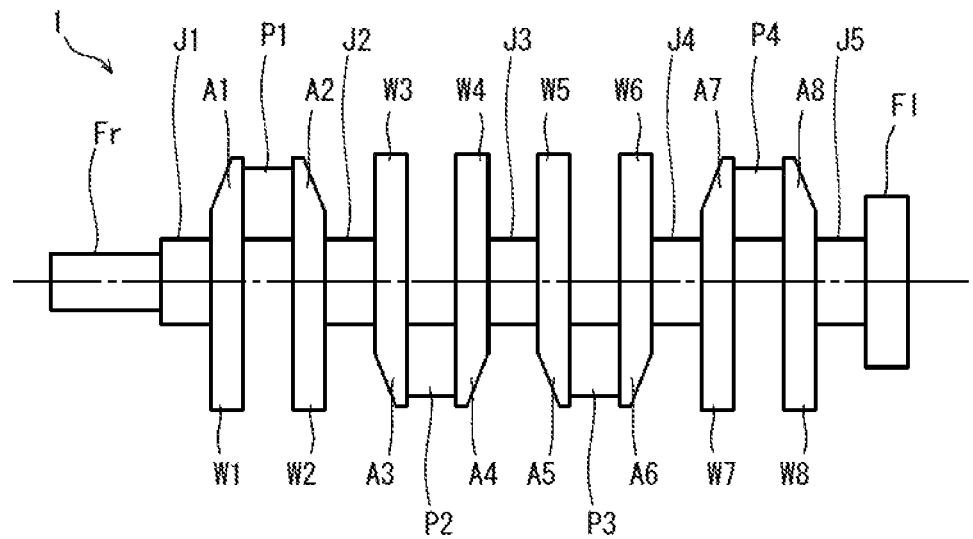
FIG. 1 is a side view to show an example of a typical crankshaft.
Figure 2:
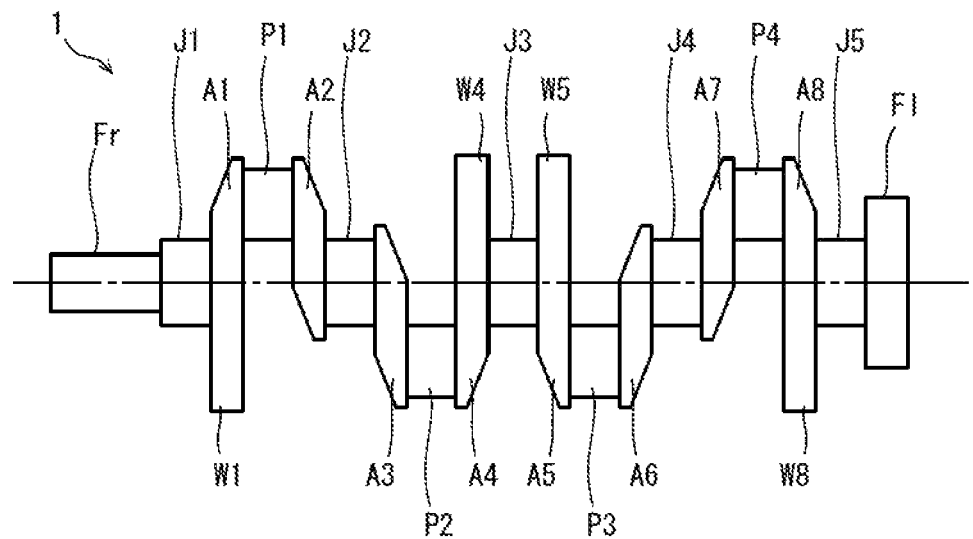
FIG. 2 is a side view to show another example of a typical crankshaft.

Referring to FIGS. 3 and 4, the crankshaft 1 assumed in the examination step 1 is a crankshaft of 4-cylinder 8-counterweight. The crankshaft 1 includes a plurality of journals J1 to J5, a plurality of pins P1 to P4, and a plurality of anus A1 to A8 as does atypical crankshaft (FIG. 1). The journals J1 to J5 are coaxially disposed with the rotational center of the crankshaft 1. Each of the pins P1 to P4 is disposed to be decentered with respect to the journals J1 to J5. Each of the arms A1 to A8 is deposed between one of the journals J3 to J5 and one of the pins P1 to P4 to connect the journal with the pin. The arms A1 to A8 integrally include weights W1 to W8, respectively.

As shown in FIG. 5, in the analysis model of the crankshaft 1, a concave thinned part 10 is formed in the rear face of the weight W of the arm A with weight W. The thinned part 10 is formed over the entire width of the weight W, expanding to the two side surfaces Wb1 and Wb2 of the weight W. This thinned part 10 is formed across the weight W and the arm A. For this reason, the thinned part 10 also extends over to the rear face and the two side surfaces Aa of the arm A.

The weight of the arm A with weight W of the examination step 1 is significantly reduced by the thinned part 10. However, the shape of the weight W has almost no effect on supporting rigidity of the arm A with weight W. For that reason, the supporting rigidity of the arm A with weight W of the examination step 1 hardly decreases. Therefore, in the case of the crankshaft 1 including the arm A with weight W having the thinned part 10, a significant weight reduction can be expected. In the present description, the supporting rigidity means deformation resistance of the arm A when a load is applied to the pin P.

Referring to FIG. 6, in the arm A with weight W, the arm A and the weight W are sectioned by a plane including the lateral centerline Ac2 and the axial centerline Jc of the journal J. That is, out of the arm A with weight W, a portion located on the pin P side is the arm A. and a portion located on the opposite side of the pin P is the weight W with a plane including the lateral centerline Ac2 and the axial centerline Jc of the journal J being as a boundary. In the present description, for convenience of explanation, of the arm A with weight W, the arm A side is referred to as an upper side, and the weight W side is referred to a lower side.

The side surface Aa of the arm A and the side surfaces Wb1 and Wb2 of the weight W extend substantially in the vertical direction. The side surfaces Wb1 and Wb2 of the weight W extend outwardly in the width direction toward downward. The side surfaces Wb1 and Wb2 are connected by a bottom surface Wa. The bottom surface Wa has an are shape centered on the axial centerline Jc of the journal J in a front view of the arm A with weight W. In the present description, the surface between the side surfaces Wb1 and Wb2 is referred to as a bottom surface Wa because the weight W side is defined as the lower side in the arm A with weight W for convenience; however, the bottom surface Wa of the weight W is not always located on the lower side in an actual crankshaft.

As shown in FIG. 6, the crankshaft 1 assumed in the examination step 1 has a thrust (hereinafter, also referred to as a "journal thrust") Jt around the journal J. The journal thrust Jt has an annular shape centered on the axial centerline Jc of the journal J in a front view of the arm A with weight W. The journal thrust Jt restricts the movement of the journal J in the direction in which the axial centerline Jc extends (axial direction). That is, in the reciprocating engine, the movement of the journal J in the axial direction is limited by the contact between the journal thrust Jt and the sliding bearing attached to the engine block (not shown).

FIG. 6 shows a portion where an added layer is provided in the examination step 1. In the examination step 1, out of the bottom surface Wa and the two side surfaces Wb1 and Wb2 of the weight W, the two side surfaces Wb1 and Wb2 were selected as the portion where the added layer is provided. The added layer (not shown) is provided in the whole area of the two side surfaces Wb1 and Wb2 indicated by a thick line in FIG. 6. The thickness of the added layer was 1 mm. A carbon steel was adopted as the material (normal material) of the portion other than the added layer of the arm A with weight W. While the Young's modulus E0 of the material (normal material) of the portion other than the added layer is kept constant, the Young's modulus E of the material (different material) of the added layer was variously changed. That is, a Young's modulus ratio indicated by E/E0 was variously changed.

For a plurality of models of crankshaft each including an arm with weight, the Young's modulus ratio E/E0 of the arm with weight was variously changed to investigate accelerance (inertance). The "accelerance" indicates a value obtained by a frequency analysis to evaluate an acceleration waveform at an observation point when a striking force (impulse excitation force) is applied, and then to divide the vibration acceleration by the excitation force for each frequency. Decrease in the accelerance means smaller vibration acceleration generated in response to the same vibration input. That is, decrease in the accelerance means that vibration could be suppressed. Therefore, comparing the accelerance of each model enables to evaluate the suppression of vibration.

Here, in the case of a crankshaft, journals of the crankshaft are each supported by a sliding bearing attached to the engine block. Thereby, the crankshaft is connected to the engine body. Therefore, to suppress the vibration of a reciprocating engine, it is necessary to suppress the vibration of the journals of the crankshaft.

As a vibration source to be inputted to the crankshaft, explosion load when explosion occurs in a cylinder is considered. The explosion load is transmitted to the piston, and further transmitted from the piston to the con-rod via the piston pin. The load transmitted to the con-rod is inputted to the pin of the crankshaft. Therefore, the pin mainly serves as the vibration source of the crankshaft. Therefore, the accelerance at the center of the journal when the surface of the pin was struck was evaluated.

Specifically, referring to FIG. 4, a striking force was inputted to a point R of the first pin P1. The point R was a point located at the center of the first pin P1 in the axial direction and at the top of the first pin P1. The striking force was applied in a direction toward the axial centerline Jc of the journal J. With respect to the input of the striking force, the acceleration generated at a point S of the fifth journal J5 was determined. The point S is a point located at the axial center of the fifth journal J5 and on the axial centerline Jc of the fifth journal J5. The acceleration to be obtained was acceleration in a direction along the input direction of the striking force.

The obtained acceleration was divided by the striking force, and thereafter was subjected to frequency analysis to determine an acceleration amplitude in a range of 1 Hz to 2500 Hz to obtain frequency characteristics of accelerance. A maximum value of the accelerance was determined from the obtained frequency characteristics of accelerance.

Note that in the vibration analysis, the Young's modulus was 210 GPa and the Poisson's ratio was 0.29 in the portion of the normal material (carbon steel).

For each of the plurality of models of crankshaft having an arm with weight, vibration analysis as described above was performed and the maximum values of the accelerance obtained by the vibration analysis were compared and evaluated. These models differ from each other in the material of the added layer provided in the weight. The evaluation was performed based on a ratio (accelerance ratio) to the maxiummn value of accelerance in the base model having no added layer. If the accelerance ratio is less than 1, it can be said that vibration is suppressed. Further, it can be said that the smaller the accelerance ratio, the more effectively the vibration can be suppressed. On the other hand, if the accelerance ratio is more than 1, it can be said that vibration cannot be suppressed.

Figure 7:
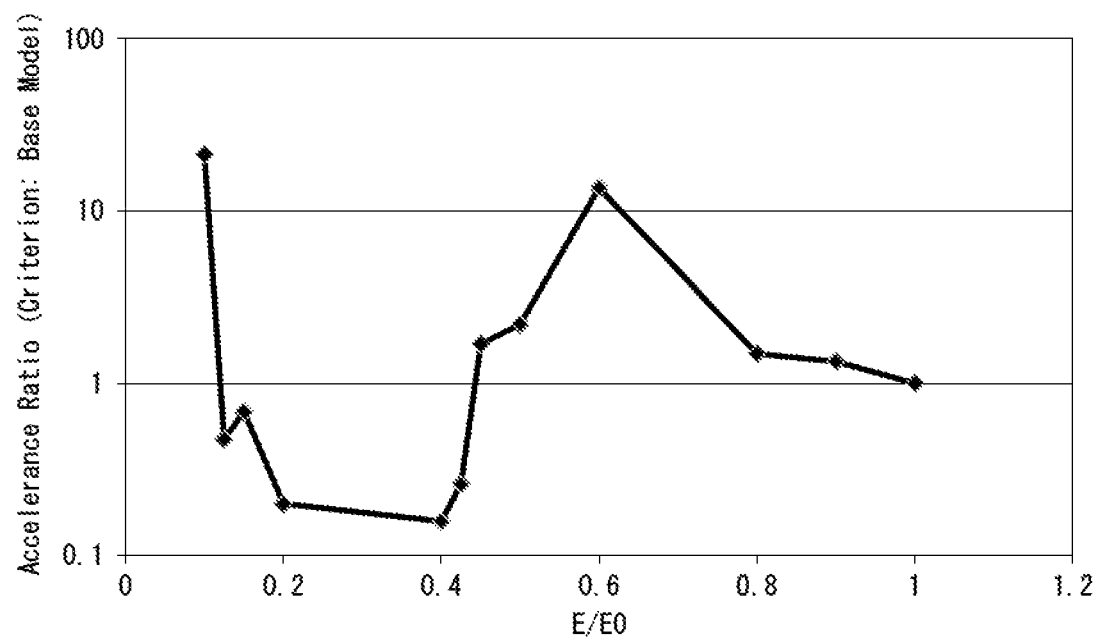
FIG. 7 is a diagram to summarize analysis results in the examination step 1.

FIG. 7 is a diagram summarizing the analysis results in the examination step 1. The followings are indicated from the results of FIG. 7. From the comparison with the base model, vibration can be suppressed if the added layer of the different material is provided in both of the two side surfaces Wb1 and Wb2 of the weight W, and the Young's modulus ratio E/E0 is 0.15 to 0.425. Particularly, if the Young's modulus ratio F/E0 is 0.2 to 0.4, vibration can be remarkably suppressed.

In short, vibration can be sufficiently suppressed only by providing the added layer of the different material on both of the two side surfaces Wb1 and Wb2 of the weight W with the Young's modulus ratio E/E0 being 0.2 to 0.4.

[Examination Step 2]

In the examination step 2, as in the examination step 1, the level of vibration when an added layer of the different material was provided in the weight was investigated. In the analysis of the examination step 2, the range of the added layer provided on the two side surfaces of the weight was subdivided and variously changed. Further, the Young's modulus ratio E/E0 was variously changed. Other conditions were the same as those in the examination step 1.

Figure 8:
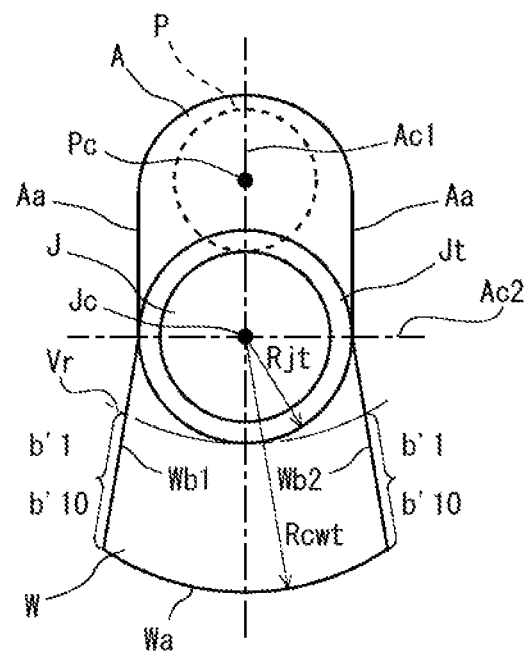
FIG. 8 is a front view of the arm with weight in the crankshaft assumed in the examination step 2 by the present inventors.
Figure 9:
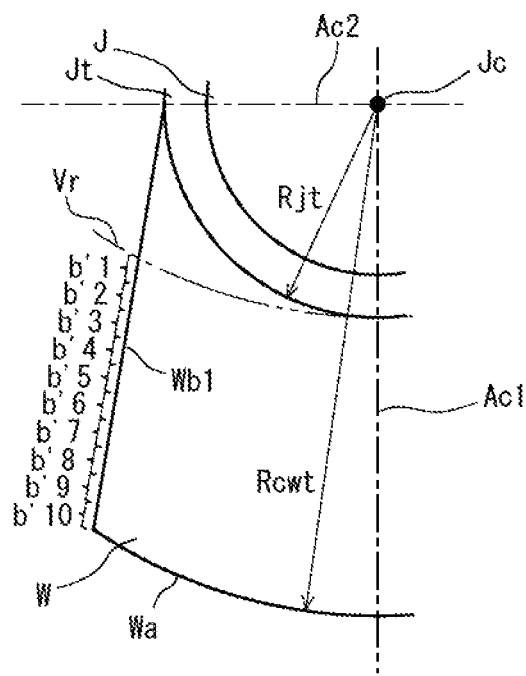
FIG. 9 is an enlarged view of a part of the arm with weight shown in FIG. 8.

FIG. 8 and FIG. 9 are diagrams showing an arm with weight in the crankshaft assumed in the examination step 2. Among these figures. FIG. 8 is a front view of the arm with weight, and FIG. 9 is an enlarged view of a part of the weight of the arm with weight shown in FIG. 8.

FIGS. 8 and 9 show portions where the added layer is provided in the examination step 2. As described above, the bottom surface Wa of the weight W has an arc shape centered on the axial centerline Jc of the journal J in a front view of the arm A with weight W. The symbols Rcwt in FIGS. 8 and 9 indicate the radius of the bottom surface Wa. The journal thrust Jt has an annular shape centered on the axial centerline Jc of the journal J in a front view of the arm A with weight W. The symbol Rjt indicates the radius of the journal thrust Jt.

As a unit in which the added layer is provided, one side surface Wb1 of the weight W is sectioned into ten regions b1 to b10 in a direction along the side surface Wb1 (longitudinal direction of the side surface Wb1). With an intersection point between the arc Vr indicated by a two-dot chain line in FIGS. 8 and 9 and the side surface Wb in a front view of the arm A with weight W as a starting point, the ten regions b1 to b10 are successively lined up from the intersection point to the bottom surface Wa of the weight W. The arc Vr is a virtual arc which has the same radius Rcwt as that of the bottom surface Wa in a front view of the arm A with weight W, and passes through the lower end (the end of the weight W side) of the journal thrust Jt. The center of the arc Vr is located on the longitudinal centerline Ac1. The length along the side surface Wb1 of each of the ten regions b1 to b10 is the same. The length along the side surface Wb1 of each of the ten regions b1 to b10 is substantially (Rcwt−Rjt)/10. Similarly, the other side surface Wb2 of the weight W is sectioned into ten regions (not shown in FIG. 9) in a direction along the side surface Wb2 (longitudinal direction of the side surface Wb2).

In the analysis of the examination step 2, the added layer was formed in both of the two side surfaces Wb1 and Wb2 of the weight W. Further, one or more regions were variously selected from the ten regions b1 to b10 in a side surface Wb1 as the region where the added layer was provided. In the other side surface Wb2, a region which was symmetrical to the region selected in the side surface Wb1 with respect to the longitudinal centerline Ac1 of the arm A was selected. The added layer was provided in the selected regions. Table 1 below shows the installation patterns of the added layer in a plurality of models of arm A with weight W investigated in the examination step 2.

TABLE 1

| Model No. | b1 | b2 | b3 | b4 | b5 | b6 | b7 | b8 | b9 | b10 |
|---|---|---|---|---|---|---|---|---|---|---|
| A | x | | | | | | | | | |
| B | | | x | | | | | | | |
| C | | | | | x | | | | | |
| D | | | | | | | x | | | |
| E | | | | | | | | | | x |
| F | x | x | x | | | | | | | |
| G | | | | | x | x | x | | | |
| H | | | | | | x | x | x | | |
| I | | | | | | | | x | x | x |
| J | x | x | x | x | x | | | | | |
| K | | | x | x | x | x | x | | | |
| L | | | | | | x | x | x | x | x |
| M | x | x | x | x | x | x | x | x | | |
| N | | x | x | x | x | x | x | x | x | |
| O | | | x | x | x | x | x | x | x | x |
| P | x | x | x | x | x | x | x | x | x | x |

(Remarks) Symbol "x" indicates a portion where the added layer is provided.
Blank column indicates a portion where the added layer is not provided.

For a plurality of models of crankshaft each including an arm with weight, an added layer was provided on the side surfaces of the weight according to the installation patterns shown in Table 1 described above, and vibration analysis was performed for each model in the same manner as in the examination step 1. In the vibration analysis of each model, the Young's modulus ratio E/E0 was changed into four levels of 0.1, 0.2, 0.4, and 0.5. Then, the maximum values of acceleration obtained by the vibration analysis of each model were compared and evaluated.

The evaluation was performed based on a ratio (acceleration ratio) to the maximum value of acceleration in the base model having no added layer.

Figure 10:
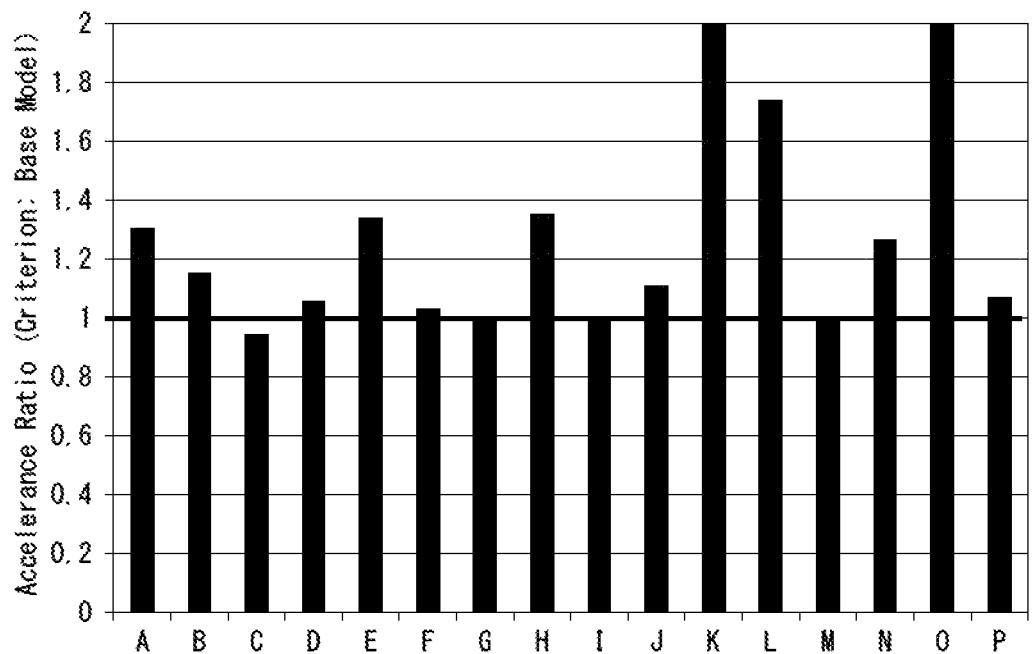
FIG. 10 is a diagram showing a summary of analysis results in the examination step 2, in which results when E/E0 is 0.1 are shown.
Figure 11:
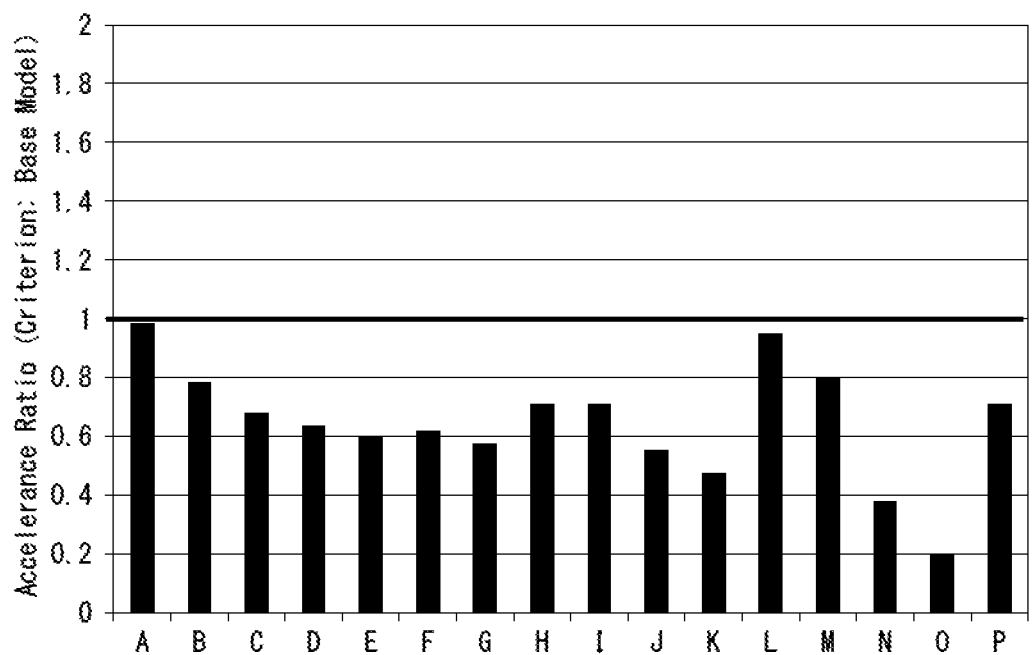
FIG. 11 is a diagram showing a summary of analysis results in the examination step 2, in which results when E/E0 is 0.2 are shown.
Figure 12:
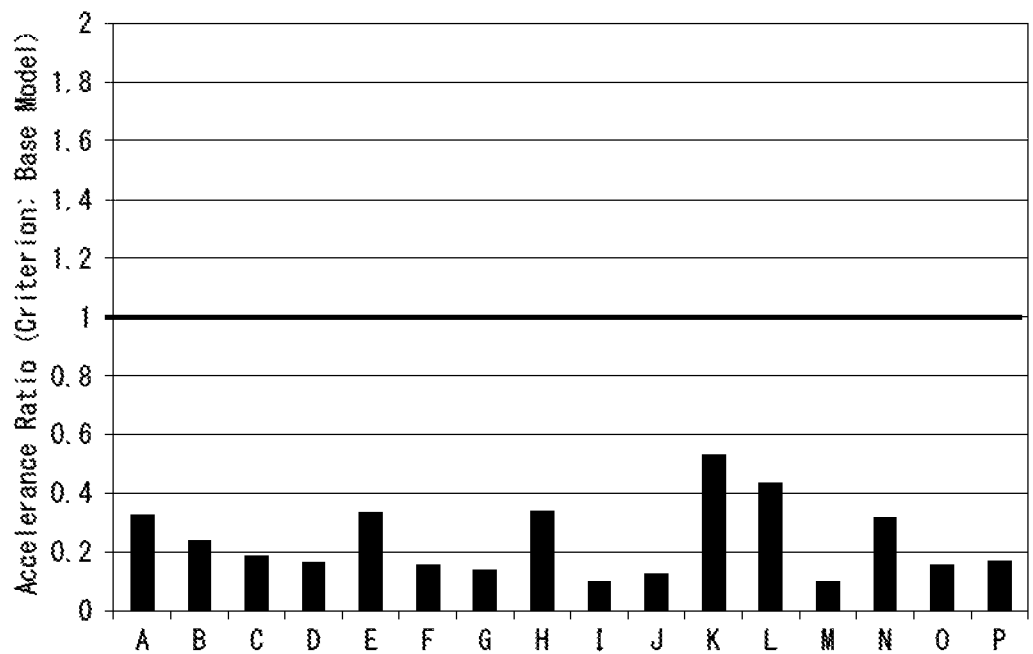
FIG. 12 is a diagram showing a summary of analysis results in the examination step 2, in which results when E/E0 is 0.4 are shown.
Figure 13:
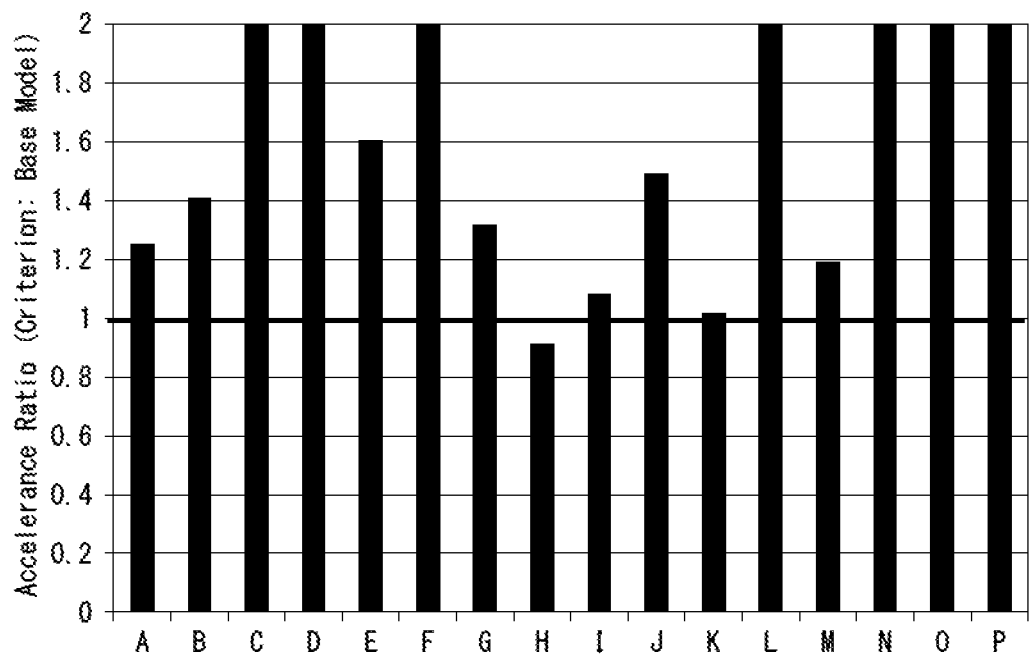
FIG. 13 is a diagram showing a summary of analysis results in the examination step 2, in which results when E/E0 is 0.5 are shown.

FIGS. 10 to 13 are diagrams summarizing the analysis results in the examination step 2. The reference symbols shown on the horizontal axis of FIGS. 10 to 13 correspond to Model Nos. shown in Table 1. Among these figures, FIG. 10 shows results when E/E0 is 0.1. FIG. 1I shows results when E/E0 is 0.2. FIG. 12 shows results when E/E0 is 0.4. FIG. 13 shows results when E/E0 is 0.5. The results of FIGS. 10 to 13 indicate the followings.

Referring to FIGS. 10 and 13, if E/E0 is 0.1 and 0.5, vibration suppression effect will not be exerted even if the added layer is provided on each of the side surfaces Wb1, Wb2 of the weight W. On the other hand, referring to FIGS. 11 and 12, if E/E0 is 0.2 to 0.4, vibration suppression effect will be exerted by providing the added layer on each of the side surfaces Wb1, Wb2 of the weight W. When E/E0 is 0.2 to 0.4, if the length of the region of the added layer along each of the side surfaces Wb1, Wb2 is 0.1 times or more of (Rcwt−Rjt), the vibration suppression effect can be achieved (see Model Nos. A to P). Particularly, referring to FIG. 12, when E/E0 is 0.4 and the length of the region of the added layer is relatively small, the vibration suppression effect is high if the region of the added layer is adjacent to the bottom surface Wa of the weight W (see Model No. I). When the length of the region of the added layer is relatively large, for example, when the length of each of the side surfaces Wb1, Wb2 of the region of the added layer is one time or more of (Rcwt−Rjt), vibration suppression effect is high (see Model No. P). Therefore, it is considered that if the added layer is provided in the whole area of the side surfaces Wb1, Wb2 of the weight W, higher vibration suppression effect can be achieved.

The crankshaft of the present disclosure has been completed based on the above described findings.

A crankshaft according to an embodiment of the present disclosure includes a plurality of journals, a plurality of pins, and a plurality of crank arms. The plurality of journals are disposed coaxially with the rotational center of the crankshaft. The plurality of pins are decentered with respect to the plurality of journals. The plurality of crank arms are each disposed between one journal and one pin, and join the one journal with the one pin. One or more of the crank anus integrally include a counterweight. The counterweight includes two side surfaces. An added layer of a material different from that of a crankshaft body is provided on each side surface of the counterweight. The crankshaft body includes journals, pins, and crank arms. When the Young's modulus of the material of the added layer is E, and the Young's modulus of the material of the crankshaft body is E0, E/E0 will be 0.2 to 0.4.

In a crankshaft according to the present embodiment, an added layer of a different material is provided on the both of the two side surfaces of the weight, and the Young's modulus ratio E/E0 of the material (different material) of the added layer with respect to the material (normal material) of the crankshaft body is 0.2 to 0.4. This makes it possible to sufficiently suppress vibration generated in the crankshaft. Moreover, no added layer can be provided on the bottom surface of the weight. Normally, when rotational balance of crankshaft is adjusted, drilling is performed in the bottom surface of the weight. When there is no added layer in the bottom surface of the weight, there is no problem with the drilling.

The method for forming the added layer will not be particularly limited. For example, the added layer may be formed by metallurgical joining or mechanical joining. A typical example of the metallurgical joining is buildup welding by using welding material of a material (different material) different from the material (normal material) of the crankshaft body. Besides, as examples of the metallurgical joining a plate piece of the different material may be joined to the weight by welding, brazing, friction welding, or friction stir welding. An added layer of the different material may be formed by film vapor deposition or thermal spraying. As examples of the mechanical joining, a plate piece of the different material may be joined to the weight by screwing, riveting, shrink fitting, or press fitting. Further, a plate piece of the different material may be joined to the weight by an adhesive.

In the crankshaft of the present embodiment, the material (different material) of the added layer and the material (normal material) of the crankshaft body which is a portion other than the added layer are not particularly limited as long as the Young's modulus ratio E/E0 is 0.2 to 0.4. For example, when the normal material is a steel (for example, a carbon steel), the material of the added layer may be Al (aluminum), Mg (magnesium), an Al alloy, a Mg alloy, and the like. Besides, the material of the added layer may be a synthetic resin (for example, rubber).

The thickness of the added layer will not be particularly limited. However, in practice, the thickness of the added layer is about 1 to 4 mm.

In a typical example, the crankshaft of the present embodiment is a crankshaft of 4-cylinder 8-counterweight or a crankshaft of 4-cylinder 4-counterweight. However, the crankshaft of the present embodiment will not be limited to this type. For example, the crankshaft of the present embodiment may be a crankshaft for a three-cylinder engine or a crankshaft for an in-line six-cylinder engine.

The number of the arms with weight in which an added layer is provided is not particularly limited. When the crankshaft has a plurality of arms with weight, an added layer may be provided in one arm with weight, or an added layer may be provided in two or more arms with weight, or an added layer may be provided in all the arms with weight. From the viewpoint of maximally reducing the vibration generated in the crankshaft, it is preferable to provide an added layer in all the arms with weight.

In a typical example, the region where the added layer is provided on one side surface of a weight is symmetrical with respect to the region where the added layer is provided on the other side surface of the weight with respect to the longitudinal centerline of the arm. However, the regions of added layer in both side surfaces of the weight may be asymmetric with respect to the longitudinal centerline of the arm. The shape of the arm with weight, although which is typically symmetric with respect to the longitudinal centerline of the arm, may also be asymmetric.

A thinned part may or may not be formed in the arm with weight. However, from the viewpoint of reducing the weight of the crankshaft, it is preferable that a thinned part is formed in the arm with weight.

In the crankshaft of the present embodiment, it is preferable that added layer is provided in the whole area of the side surface of the counterweight. In this case, vibration suppression effect for the crankshaft is high.

In the crankshaft of the present embodiment, the added layer may be provided in a part of each side surface of the counterweight. In this case, when the radius of the bottom surface of the counterweight is defined as Rcwt and the radius of the thrust of the journal is defined as Rjt, the length of the added layer in the longitudinal direction of each side surface of the counterweight is preferably 0.1 times or more of (Rcwt−Rjt). The length of the added layer is preferably 0.3 times or more of (Rcwt−Rjt), and more preferably 0.8 times or more of (Rcwt−Rjt). In this case, vibration suppression effect for the crankshaft is high.

When an added layer is provided in a part of the side surface of the counterweight, this added layer is preferably adjacent to the bottom surface of the counterweight. In this case, vibration suppression effect for the crankshaft is high.

Hereinafter, referring to the drawings, a specific example of the crankshaft of the present embodiment will be described.

Figure 14:
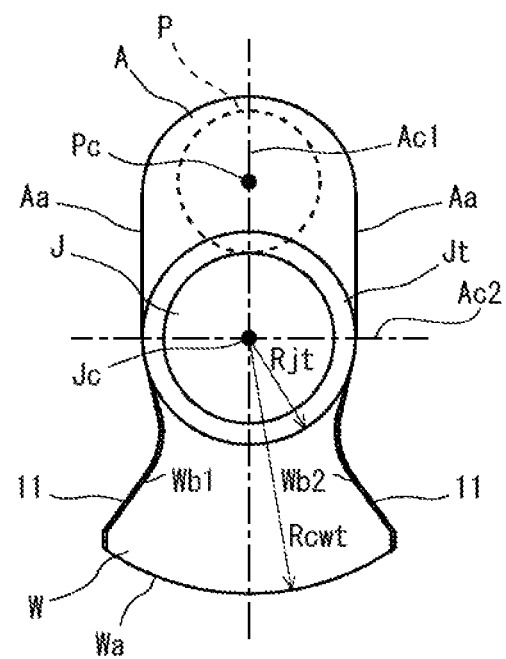
FIG. 14 is a front view of the arm with weight in the crankshaft of an embodiment.

FIG. 14 is a front view of an arm with weight in the crankshaft of the present embodiment. The arm A with weight W shown in FIG. 14 can be applied to all of the eight arms with weight provided in the crankshaft of, for example, 4-cylinder 8-counterweight.

Referring to FIG. 14, the shape of the arm A with weight W is symmetric with respect to the longitudinal centerline Ac1 of the arm A. The weight W has a constricted part and is widened from the constricted part toward the bottom surface Wa in a front view of the arm A with weight W. That is, the width of the weight W is smaller on the journal thrust Jt side and larger on the bottom surface Wa side. The weight W has a maximum width at the lower end of the side surface Wb1, Wb2 (the end on the bottom surface Wa side). An added layer 11 of the different material is provided on the whole area of each of the two side surfaces Wb1 and Wb2 of the weight W. That is, the added layer 11 is provided in the entire range of the side surfaces Wb1 and Wb2 from the lateral centerline Ac2 side of the arm A to the bottom surface Wa side of the weight W in a front view of the arm A with weight W. This added layer 11 is formed by, for example, buildup welding. The material of the added layer 11 is, for example, Al. The material of the portion other than the added layer 11 of the arm A with weight W is a normal material such as, for example, a carbon steel. According to the crankhaft including such arm A with weight W, the vibration generated in the crankshaft can be sufficiently suppressed.

In addition, it is needless to say that the present disclosure is not limited to the above described embodiments, and various alterations can be made without departing from the spirit of the present disclosure.

INDUSTRIAL APPLICABILITY

The present disclosure can be effectively used for a crankshaft mounted on any reciprocating engine.

REFERENCE SIGNS LIST

1: Crankshaft
J, J1 to J5: Journal
Jc: Axial centerline of journal
Jt: Thrust of journal
P, P1 to P4: Pin
Pc: Axial centerline of pin
A, A1 to A8: Crank arm
Aa: Side surface of crank arm
Ac1: Longitudinal centerline of arm
Ac2: Lateral centerline of arm
W, W1 to W8: Counterweight
Wa: Bottom surface of counterweight
Wb1, Wb2: Side surface of counterweight
11: Added layer

The invention claimed is:

1. A crankshaft for a reciprocating engine, the crankshaft comprising:
a plurality of journals which are disposed coaxially with a rotational center of the crankshaft;
a plurality of pins which are decentered with respect to the plurality of journals; and
a plurality of crank arms which are each disposed between one journal and one pin, and join the one journal with the one pin, wherein
one or more of the crank arms integrally include a counterweight including two side surfaces,
an added layer of a material different from that of a crankshaft body including the journals, the pins, and the crank arms is provided on each of the side surfaces of the counterweight, and
when the Young's modulus of the material of the added layer is E and the Young's modulus of the material of the crankshaft body is E0, E/E0 is 0.2 to 0.4.

2. The crankshaft according to claim 1, wherein the added layer is provided in a whole area of the side surface of the counterweight.

3. The crankshaft according to claim 1, wherein the counterweight further includes:
a bottom surface having an arc-shape centered on an axial centerline of the journals, and connecting the two side surfaces, and wherein
when a radius of the bottom surface is defined as Rcwt, and a radius of a thrust of the journal is defined as Rjt, a length of the added layer in a longitudinal direction of the side surface is 0.1 times or more of (Rcwt−Rjt).

4. The crankshaft according to claim 3, wherein the added layer is adjacent to the bottom surface of the counterweight.

* * * * *